United States Patent
Hsieh et al.

(10) Patent No.: US 9,599,882 B2
(45) Date of Patent: Mar. 21, 2017

(54) ILLUMINATION SYSTEM AND PROJECTION APPARATUS

(71) Applicants: Chi-Tang Hsieh, Hsin-Chu (TW);
Chia-Hao Wang, Hsin-Chu (TW);
Ko-Shun Chen, Hsin-Chu (TW);
Chi-Hsun Wang, Hsin-Chu (TW)

(72) Inventors: Chi-Tang Hsieh, Hsin-Chu (TW);
Chia-Hao Wang, Hsin-Chu (TW);
Ko-Shun Chen, Hsin-Chu (TW);
Chi-Hsun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 331 days.

(21) Appl. No.: 14/446,337

(22) Filed: Jul. 30, 2014

(65) Prior Publication Data
US 2015/0077714 A1    Mar. 19, 2015

(30) Foreign Application Priority Data
Sep. 18, 2013   (TW) .............................. 102133964 A

(51) Int. Cl.
*G03B 21/20* (2006.01)
*G02B 5/00* (2006.01)
(Continued)

(52) U.S. Cl.
CPC ........... *G03B 21/204* (2013.01); *G02B 5/001* (2013.01); *G02B 27/095* (2013.01);
(Continued)

(58) Field of Classification Search
CPC ......... G02B 27/09; G02B 27/18; F02B 5/001; G03B 21/20; G03B 21/14; H04N 9/31; F21V 13/02; F21V 14/08; F21V 5/00; F21V 5/04
See application file for complete search history.

(56) References Cited

U.S. PATENT DOCUMENTS 5,572,367 A * 11/1996 Jung .................. G02B 13/18
                                                          359/641
6,870,650 B2    3/2005 Kappel et al.
(Continued)

FOREIGN PATENT DOCUMENTS

CN    101405653    4/2009
CN    102147562    8/2011
(Continued)

OTHER PUBLICATIONS

"Office Action of China Counterpart Application", issued on Nov. 24, 2015, p. 1-p. 9.
(Continued)

*Primary Examiner* — Sultan Chowdhury
*Assistant Examiner* — Danell L Owens
(74) *Attorney, Agent, or Firm* — Jianq Chyun IP Office

(57) ABSTRACT

An illumination system including at least one laser source, at least one anisotropic light expanding element and a wavelength conversion element is provided. The at least one laser source emits a laser beam. The at least one anisotropic light expanding element is disposed on the transmission path of the laser beam and causes the laser beam to expand along a light expanding direction. The light expanding direction is substantially parallel to the slow axis of the laser beam. The wavelength conversion element is disposed on the transmission path of the laser beam. A projection apparatus is also provided.

28 Claims, 15 Drawing Sheets

(51) Int. Cl.
*G02B 27/09* (2006.01)
*H04N 9/31* (2006.01)

(52) U.S. Cl.
CPC ....... *G02B 27/0927* (2013.01); *H04N 9/3158* (2013.01); *H04N 9/3161* (2013.01)

(56) References Cited

U.S. PATENT DOCUMENTS

| | | |
|---|---|---|
| 7,271,962 B2 | 9/2007 | Kasazumi et al. |
| 7,554,737 B2 | 6/2009 | Knox et al. |
| 8,109,638 B2 | 2/2012 | Chen et al. |
| 2007/0291484 A1 | 12/2007 | Chen et al. |
| 2008/0278689 A1 | 11/2008 | Read et al. |
| 2009/0185141 A1 | 7/2009 | Chen et al. |
| 2009/0268168 A1 | 10/2009 | Wang |
| 2012/0080411 A1 | 4/2012 | Mizuyama et al. |
| 2012/0275174 A1* | 11/2012 | Takahashi ............ B82Y 20/00 362/487 |
| 2015/0077714 A1 | 3/2015 | Hsieh et al. |

FOREIGN PATENT DOCUMENTS

| | | |
|---|---|---|
| CN | 102375315 | 3/2012 |
| CN | 102707553 | 10/2012 |
| CN | 102879988 | 1/2013 |
| CN | 103062672 | 4/2013 |
| JP | 2009258738 | 11/2009 |
| JP | 2011510357 | 3/2011 |
| TW | I300834 | 9/2008 |
| TW | 201213858 | 4/2012 |
| TW | 201215987 | 4/2012 |
| TW | 201235618 | 9/2012 |
| WO | 2011161931 | 12/2011 |

OTHER PUBLICATIONS

"Office Action of Taiwan Counterpart Application," issued on Dec. 25, 2014, p. 1-p. 3.

* cited by examiner

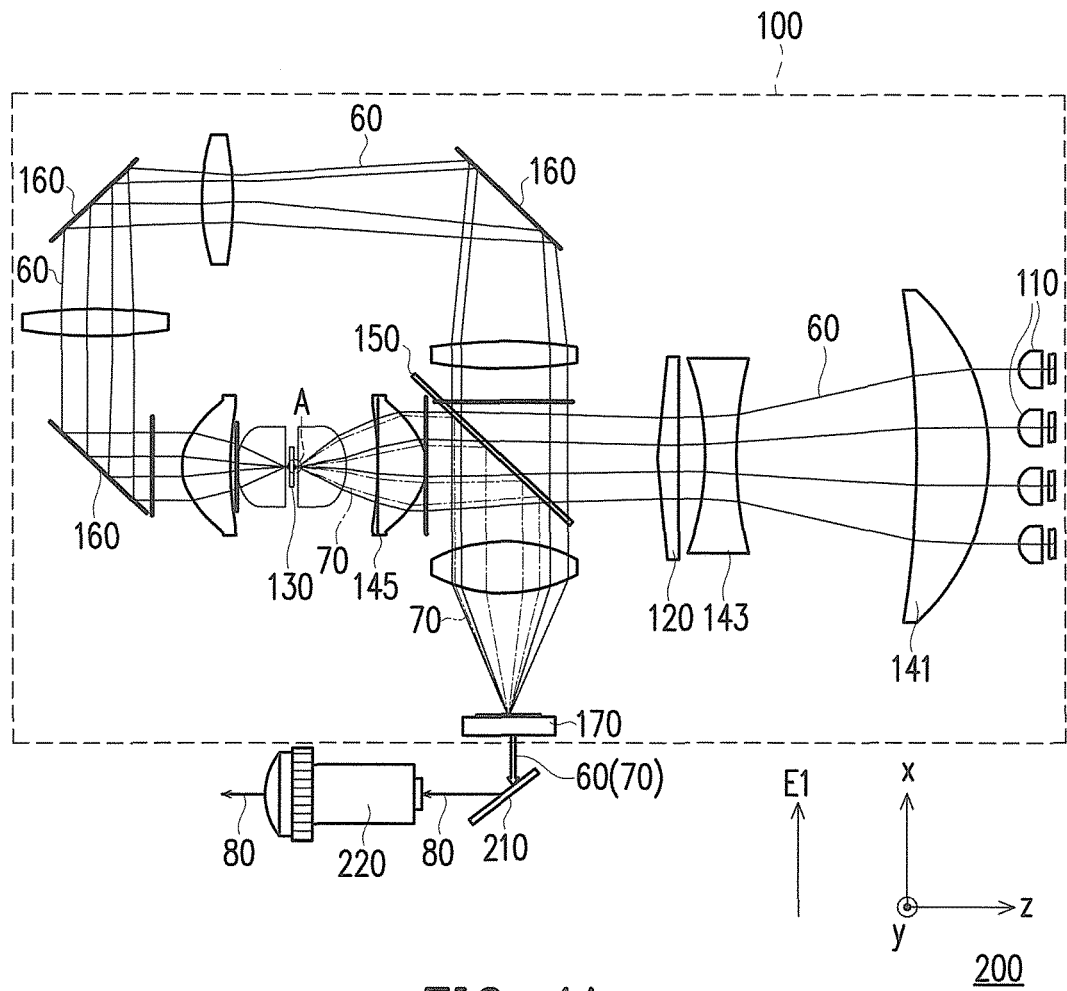
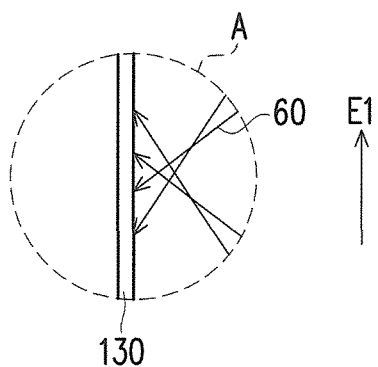
FIG. 1A
FIG. 1B

ILLUMINATION SYSTEM AND PROJECTION APPARATUS

CROSS-REFERENCE TO RELATED APPLICATION

This application claims the priority benefit of Taiwan application serial no. 102133964, filed on Sep. 18, 2013. The entirety of the above-mentioned patent application is hereby incorporated by reference herein and made a part of this specification.

BACKGROUND OF THE INVENTION

1. Field of the Invention

The invention relates to an optical system and a display apparatus, and particularly relates to an illumination system and a projection apparatus.

2. Description of Related Art

Recently, projection apparatuses using solid-state optical sources such as light emitting diodes (LED) and laser diodes have a more and more important role on the market. Also, laser diodes have a 20% higher light emitting efficiency. In order to break through the limitation on the optical source of the LEDs, a pure-color optical source for a projector generated by using a laser source to excite phosphor has been developed. Besides, in addition to using a laser source to excite phosphor, a laser projection apparatus may also directly use a laser beam as an illumination optical source of the projector and has the advantage of adjusting a number of optical sources to meet the brightness requirement, thereby satisfying the needs for different degrees of brightness of the projectors. Thus, the laser source in a projector framework adapting an optical source system with a laser source has a great potential to replace the conventional ultra high pressure lamp and become the new optical source of the mainstream projectors.

Generally speaking, laser projectors use a plurality of laser arrays and focuses laser on a phosphor layer to achieve a sufficient fluorescent intensity for output. However, as the demand to the output brightness of the laser projectors gradually increases, the input laser power needs to increase as well. Furthermore, as the input laser power increases, a laser conversion efficiency may decrease due to over-concentration of laser energy. Therefore, the laser energy converted into thermal energy at the phosphor layer increases, making the temperature of the phosphor layer increases, which may influence a light emitting efficiency of the phosphor.

Generally speaking, in the laser projectors, a diffusion film may be disposed on a path on which a laser beam is transmitted from the laser source to a fluorescent wheel, so as to diffuse a laser light spot and uniform the energy. However, the diffusion film itself may result in loss of energy. In addition, when the laser beam is emitted away from a light emitting surface of the laser beam, there is a difference between a fast axis (i.e. a long axis of the laser beam) and a slow axis (i.e. a short axis of the laser beam) for a divergence angle. In other words, the beam emitted from the light emitting surface of the laser source may be formed in an elliptical cone shape. Therefore, when the laser beam is coupled to the fluorescent wheel, the laser light spot formed on the fluorescent wheel is also in an elliptical cone shape. However, since the diffusion direction of the diffusion film is isotropic, the laser light spot formed on the fluorescent wheel may have a long axis that is overly long, causing difficulty in optical coupling and loss in the energy utilization efficiency.

Taiwan patent No. 1300834 discloses an illumination system including a point light source array, a collimator, and a lens. Taiwan patent publication No. 201215987 discloses a projection apparatus including a light source, a light valve, a light uniforming device, and a lens module. U.S. Pat. No. 8,109,638 discloses a projector including a light source, a modulation area, and a projection lens.

SUMMARY OF THE INVENTION

The invention provides an illumination system having a good luminescent spectrum and reliability.

The invention provides a projection apparatus having good image quality and reliability.

Other objects and advantages of the invention can be further illustrated by the technical features broadly embodied and described as follows.

In order to achieve one or a portion of or all of the objects or other objects, one embodiment of the invention provides an illumination system. The illumination system includes at least one laser source, at least one anisotropic light expanding element, and a wavelength conversion element. The at least one laser source emits a laser beam. The at least one anisotropic light expanding element is located on a transmitting path of the laser beam and allows the laser beam to expand in a light expanding direction. The light expanding direction is substantially parallel to a slow axis of the laser beam. The wavelength conversion element is located on the transmitting path of the laser beam.

An embodiment of the invention provides a projection apparatus. The projection apparatus includes the illumination system described above, a light valve, and a projection lens. The wavelength conversion element includes at least one wavelength conversion area and at least one light transmission area. The at least one wavelength conversion area and the at least one light transmission area are capable of moving, so as to cut into the transmitting path of the laser beam by turns. The laser beam passes through the wavelength conversion element when the at least one light transmission area cuts into the transmitting path of the laser beam, and the laser beam is converted into at least one converted beam by the at least one wavelength conversion area when the at least one wavelength conversion area cuts into the transmitting path of the laser beam. The light valve is disposed on the transmitting path of the laser beam and a transmitting path of the converted beam, so as to convert the laser beam and the converted beam into an image beam. The projection lens is disposed on a transmission path of the image beam.

In an embodiment of the invention, the anisotropic light expanding element includes an optical axis and a bent surface that includes a plurality of subsurfaces connected to each other. At least some of the subsurfaces are arranged along the light expanding direction, and the subsurfaces have different inclination angles with respect to the optical axis.

In an embodiment of the invention, after the laser beam passes through the at least one anisotropic light expanding element, the laser beam converges and then expands in the light expanding direction.

In an embodiment of the invention, a boundary of at least two adjacent subsurfaces is a ridge, and a fast axis of the laser beam is substantially parallel to the ridge.

In an embodiment of the invention, the anisotropic light expanding element is a wadge-shaped element, the subsurfaces connected to each other are arranged along a first direction, and the fast axis of the laser beam is substantially parallel to the first direction.

In an embodiment of the invention, two adjacent subsurfaces form a concave portion.

In an embodiment of the invention, two adjacent subsurfaces form a convex surface.

In an embodiment of the invention, every two adjacent subsurfaces form a convex surface, and there is a plurality of concave portions between the convex surfaces.

In an embodiment of the invention, the subsurfaces connected to each other are arranged to surround the optical axis, such that the bent surface forms a pyramidal surface.

In an embodiment of the invention, the wavelength conversion element includes at least one wavelength conversion area and at least one light transmission area. The at least one wavelength conversion area and the at least one light transmission area are capable of moving, such that the at least one wavelength conversion area and the at least one light transmission area cut into the transmitting path of the laser beam by turns. The laser beam passes through the wavelength conversion element when the at least one light transmission area cuts into the transmitting path of the laser beam, and the laser beam is converted into at least one converted beam by the wavelength conversion area when the at least one wavelength conversion area cuts into the transmitting path of the laser beam. The illumination system further includes a light combining element located between the at least one laser source and the wavelength conversion element, and located on the transmitting path of the at least one converted beam and the transmitting path of the laser beam that passes through the wavelength conversion element.

In an embodiment of the invention, the wavelength conversion element is located on the transmitting path of the laser beam between the at least one laser source and the anisotropic light expanding element. When the at least one light transmission area inserts into the transmitting path of the laser beam, the laser beam passes through the wavelength conversion element to be transmitted to the anisotropic light expanding element and is transmitted to the light combining element through the anisotropic light expanding element.

In an embodiment of the invention, the anisotropic light expanding element is located between the at least one laser source and the wavelength conversion element, and the laser beam is transmitted to the wavelength conversion element through the anisotropic light expanding element.

In an embodiment of the invention, the at least one anisotropic light expanding element includes two anisotropic light expanding elements. One of the two anisotropic light expanding elements is located between the at least one laser source and the wavelength conversion element, and the wavelength conversion element is located on the transmitting path of the laser beam between the at least one laser source and the other of the two anisotropic light expanding elements.

In an embodiment of the invention, the anisotropic light expanding element includes a plurality of cylindrical lenses that are arranged along the light expanding direction and extend along a first direction. In addition, the fast axis of the laser beam is substantially parallel to the first direction.

In an embodiment of the invention, the anisotropic light expanding element is an anisotropic diffusion film.

Based on the above, the embodiments of the invention may have at least one of the following advantages or effects. The illumination system and projection apparatus according to the embodiments of the invention achieve light expanding of the laser beam along the direction of the slow axis by using the anisotropic light expanding element. Therefore, a laser light spot may be adjusted anisotropically, and energy concentration is reduced. Moreover, the optical coupling loss that may be potentially rendered when the laser beam is coupled to the wavelength conversion element is prevented. The illumination system and projection apparatus according to the embodiments of the invention achieve light expanding of the laser beam along the direction of the slow axis by using the anisotropic light expanding element. In this way, a laser light spot may be adjusted anistropically, thereby improving uniformity of illumination and image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 1A is a schematic view illustrating a framework of a projection apparatus according to an embodiment of the invention.

FIG. 1B is an enlarged schematic view of a partial area illustrating a beam distribution of a laser beam of FIG. 1A proximate to a color wheel.

DESCRIPTION OF THE EMBODIMENTS

Figure 2A:
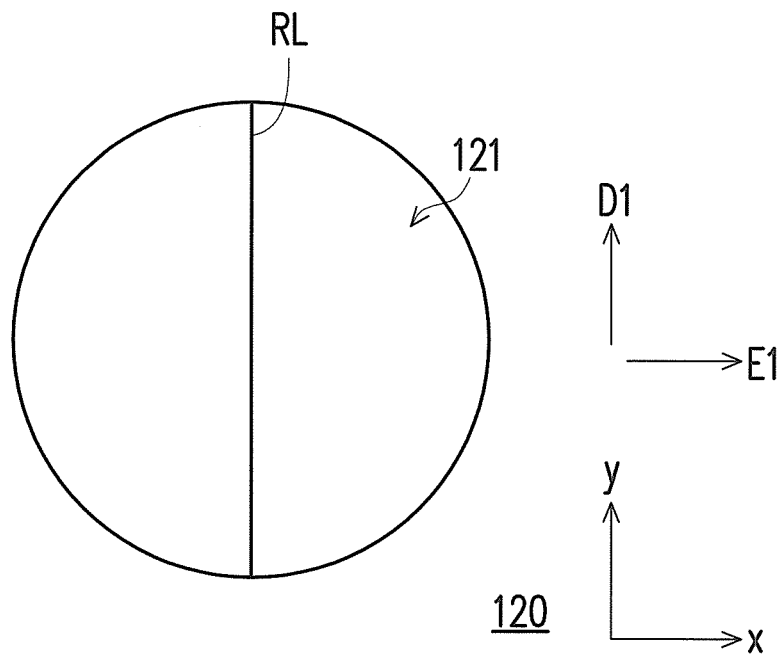
FIG. 2A is a schematic front view illustrating an anisotropic light expanding element of FIG. 1A.

In the following detailed description of the preferred embodiments, reference is made to the accompanying drawings which four a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

FIG. 1A is a schematic view illustrating a framework of a projection apparatus according to an embodiment of the invention. FIG. 1B is a partially enlarged schematic view illustrating beam distribution of a laser beam of FIG. 1A adjacent to a color wheel. Referring to FIG. 1A, a projection apparatus 200 includes an illumination system 100, a light valve 210, and a projection lens 220. In this embodiment, the light valve 210 is a digital micro-mirror device (DMD) or a liquid-crystal-on-silicon panel (LCOS panel), for example. However, in other embodiments, the light valve 210 may be a transmissive liquid crystal panel or other spatial light modulators.

Specifically speaking, in this embodiment, the illumination system 100 includes at least one laser source 110, at least one anisotropic light expanding element 120, and a wavelength conversion element 130. For example, the laser source 110 may be a blue laser diode bank, a laser beam 60 is then a blue laser beam, and the wavelength conversion element 130 is a wavelength conversion wheel. However, the invention is not limited thereto. Besides, in this embodiment, the anisotropic light expanding element 120 is located on a transmitting path of the laser beam 60, and is located between the at least one laser source 110 and the wavelength conversion element 130. More specifically, in this embodiment, the illumination system 100 further includes a plurality of lenses 141, 143, and 145, which are located between the laser source 110 and the wavelength conversion element 130. The anisotropic light expanding element 120 is located between the lens 143 and the lens 145, and the laser beam 60 is transmitted to the wavelength conversion element 130 through the anisotropic light expanding element 120.

Moreover, in this embodiment, the laser source 110 emits the laser beam 60. Generally speaking, when the laser beam is emitted away from a light emitting surface of the laser source 110, there is a difference between a fast axis (i.e. a long axis of the laser beam 60) and a slow axis (i.e. a short axis of the laser beam) for a divergence angle. In other words, the beam emitted from the light emitting surface of the laser source 110 forms an elliptical cone, while the anisotropic light expanding element 120 allows the laser beam 60 to expand in a light expanding direction E1. Also, in this embodiment and as shown in an enlarged area A of FIG. 1B, after the laser beam 60 passes through the anisotropic light expanding element 120 and then passes through the lens 145, the laser beam 60 converges and then expands/diverges in the light expanding direction E1 in one embodiment. Therefore, the anisotropic light expanding element 120 provided in this embodiment allows the laser beam 60 to focus in advance on one side of the wavelength conversion element 130 that receives the laser beam 60 and then expand, such that energy concentration of the laser beam 60 is reduced and a reaction area of the laser beam 60 connecting to the wavelength conversion element 130 is increased, thereby increasing a wavelength conversion efficiency of the laser beam 60.

In this embodiment, the light expanding direction E1 is substantially parallel to the slow axis of the laser beam 60. The slow axis of the laser beam 60 is in x direction, for example, and the fast axis of the laser beam 60 is in y direction, for example. In this way, a shaping effect to a light spot generated when the laser beam 60 is emitted to the wavelength conversion element 130 is achieved. Namely, the beam is changed from elliptical cone-shaped to approximately cone-shaped, thereby preventing loss in optical coupling that may have been rendered when the laser beam is coupled to the wavelength conversion element 130. A structure and effect of the anisotropic light expanding element 120 are further elaborated below with reference of FIGS. 2A to 5B.

Figure 2B:
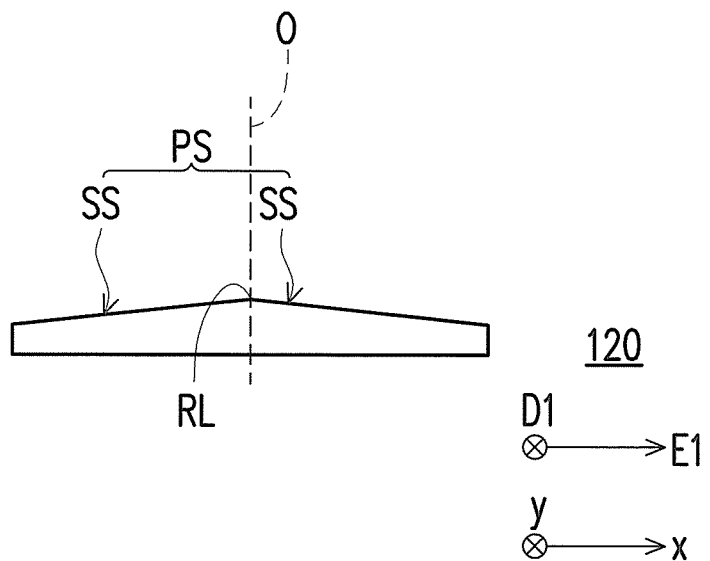
FIG. 2B is a schematic cross-sectional view illustrating the anisotropic light expanding element of FIG. 2A.

FIG. 2A is a schematic front view illustrating an anisotropic light expanding element of FIG. 1A. FIG. 2B is a schematic cross-sectional view illustrating the anisotropic light expanding element of FIG. 2A. Referring to FIGS. 2A and 2B, in this embodiment, the anisotropic light expanding element 120 includes an optical axis O and a bent surface 121 that includes a plurality of subsurfaces SS connected to each other. At least some the subsurfaces SS are arranged along the light expanding direction E1, and the subsurfaces SS have different inclination angles with respect to the optical axis O. In this embodiment, the light expanding direction E1 is x direction, for example. More specifically, in this embodiment, the anisotropic light expanding element 120 is a wadge-shaped element. The subsurfaces SS that are connected to each other extend along a first direction D1, and the fast axis of the laser beam 60 is substantially parallel to the first direction D1. In this embodiment, the first direction D1 is y direction, for example.

Furthermore, as shown in FIG. 2B, two adjacent subsurfaces SS having different inclination angles with respect to the optical axis O may form a convex surface PS in this embodiment. In addition, in this embodiment, a boundary of two adjacent subsurfaces SS that are adjacent to each other is a ridge RL, and an extending direction of the ridge RL is the first direction D1. In other words, the fast axis of the laser beam 60 is substantially parallel to the ridge RL.

Figure 3:
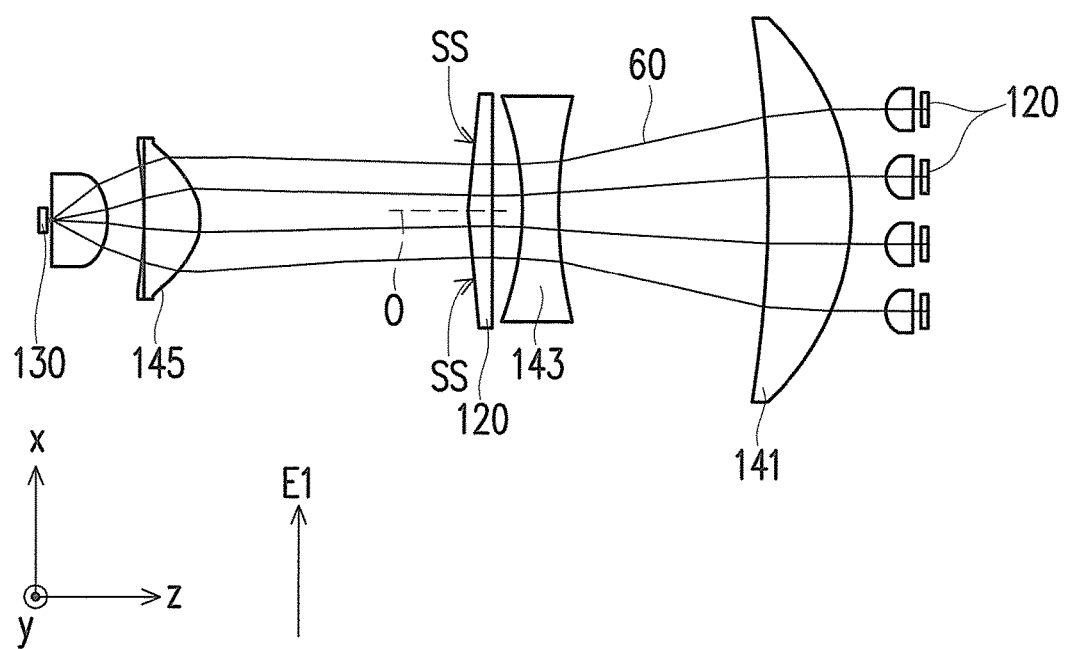
FIG. 3 is a schematic view illustrating a light path of the anisotropic light expanding element of FIG. 2A.
Figure 4A:
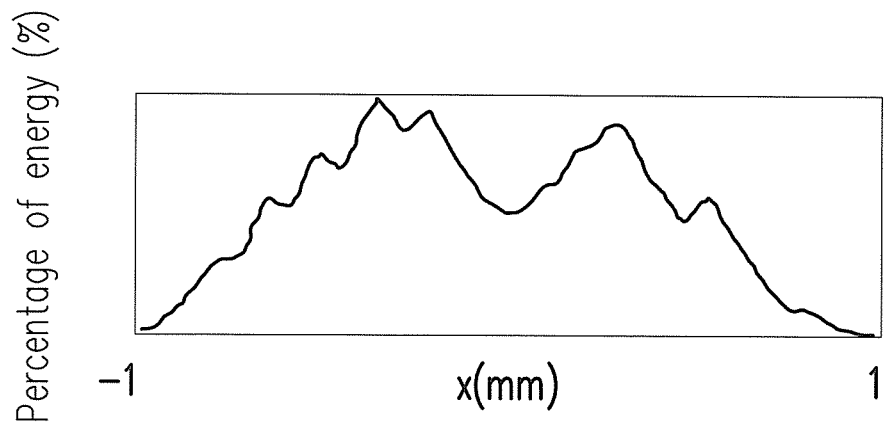
FIGS. 4A and 4B are diagrams illustrating beam distribution after the laser beam passes through the anisotropic light expanding element.
Figure 4B:
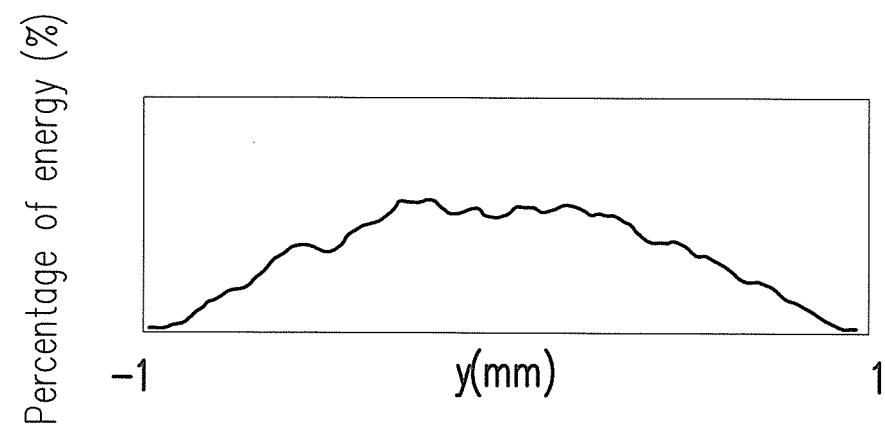
Figure 5A:
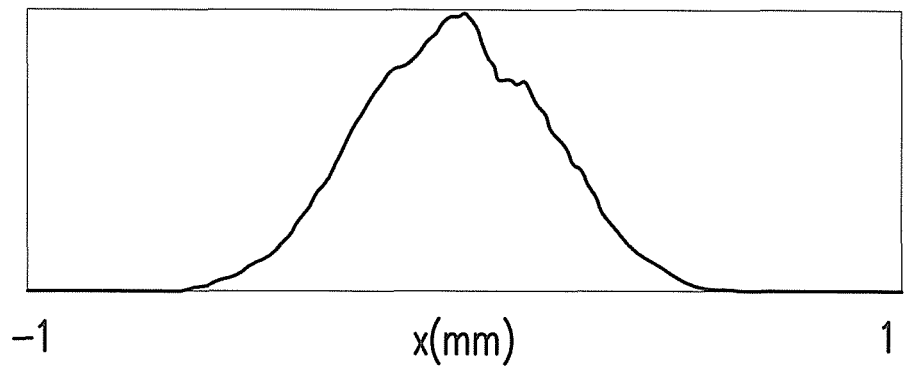
FIGS. 5A and 5B are diagrams illustrating beam distribution when the laser beam does not pass through the anisotropic light expanding element.
Figure 5B:
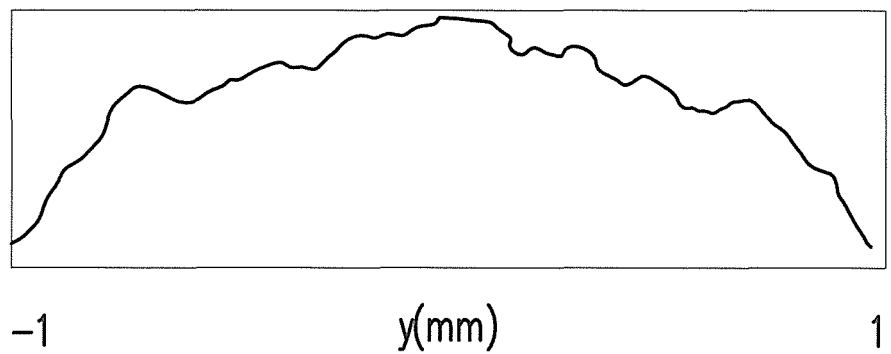

FIG. 3 is a schematic view illustrating a light path of the anisotropic light expanding element of FIG. 2A. FIGS. 4A and 4B are diagrams illustrating beam distribution after the laser beam passes through the anisotropic light expanding element. FIGS. 5A and 5B are diagrams illustrating beam distribution when the laser beam does not pass through the anisotropic light expanding element. As shown in FIG. 3, when the laser beam passes through the anisotropic light expanding element 120, since the subsurfaces SS of the anisotropic light expanding element 120 have different inclination angles with respect to the optical axis O, a direction to which the laser beam 60 is deflected when passing through the subsurfaces SS of the anisotropic light expanding element 120 may differ as well, so the effect of adjusting a light spot may be achieved. More specifically, as shown in FIGS. 4A and 4B, since the subsurfaces SS are arranged along the light expanding direction E1 (i.e. x direction) in this embodiment, the anisotropic light expanding element 120 mainly serves to deflect a component of the laser beam 60 in x direction, but does not deflect a component in y direction. Comparing results of FIGS. 4A and 4B with those of FIGS. 5A and 5B, it is further observed that after the laser beam 60 passes through the anisotropic light expanding element 120, a laser light spot on the slow axis (i.e. x direction) may be expanded, whereas a size of the laser light spot on the fast axis (i.e. y direction) remains the same. In addition, given that an energy distribution peak value of the laser beam 60 in the embodiment of FIGS. 5A and 5B is 100%, an energy distribution peak value of the laser beam 60 in the embodiment of FIGS. 4A and 4B is 53%. Therefore, the anisotropic light expanding element 120 is capable of making an anisotropic adjustment to the laser light spot and reducing energy concentration, thereby preventing a potential optical coupling loss rendered when the laser beam is coupled to the wavelength conversion element 130 afterwards. Furthermore, an issue of heat accumulation of a fluorescent wheel may be reduced.

Then, referring to FIG. 1A again, in this embodiment, the illumination system 100 further includes a light combining element 150 located between the at least one laser source 110 and the wavelength conversion element 130 and on the transmitting path of the laser beam 60 that passes through the wavelength conversion element 130. Specifically, the light combining element 150 is a dichroic mirror or a dichroic prism and is capable of providing different optical effects to beams of different colors. For example, in this embodiment, the light combining element 150 allows a blue beam to pass through and provides a reflecting effect to beams of other colors (e.g. red, green, yellow, etc.), for example. Namely, in this embodiment, the light combining element 150 allows the laser beam 60 to pass through. In this way, the laser beam 60 may pass through the light combining element 150 to be emitted to the wavelength conversion element 130.

Figure 6:
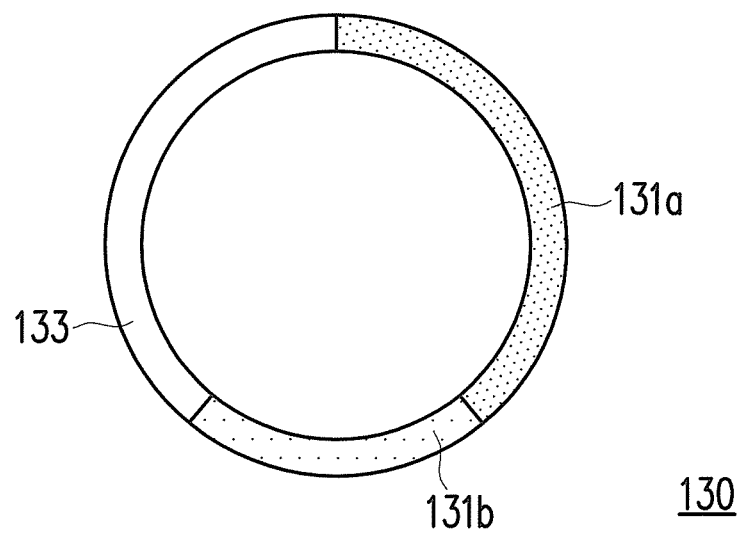
FIG. 6 is a schematic front view illustrating a wavelength conversion element of FIG. 1A.
Figure 7A:
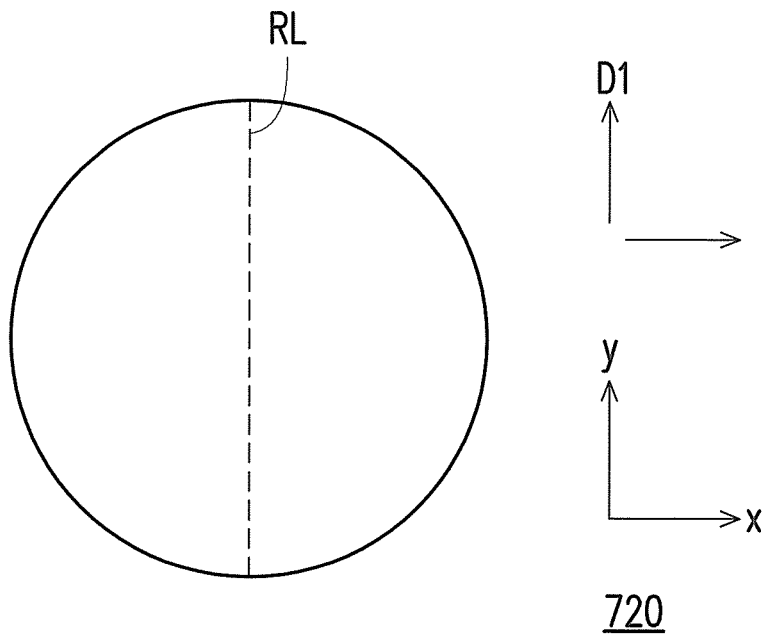
FIGS. 7A, 8A, 9A, and 10A are schematic front views illustrating changes of different anisotropic light expanding elements of FIG. 1A.
Figure 7B:
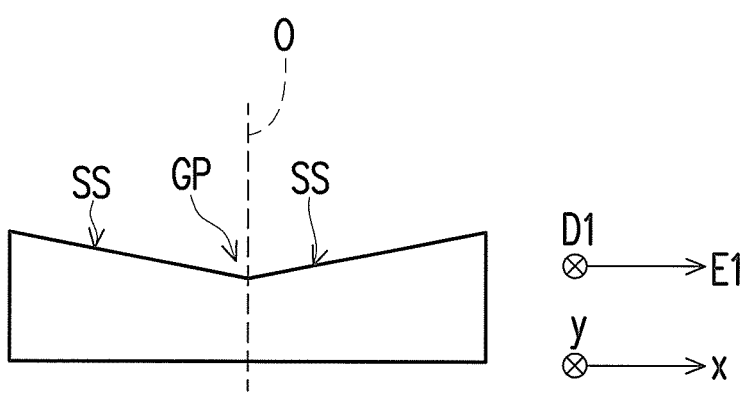
FIGS. 7B, 8B, 9B, and 10B are respectively schematic cross-sectional views illustrating the anisotropic light expanding elements of FIGS. 7A, 8A, 9A, and 10A.
Figure 8A:
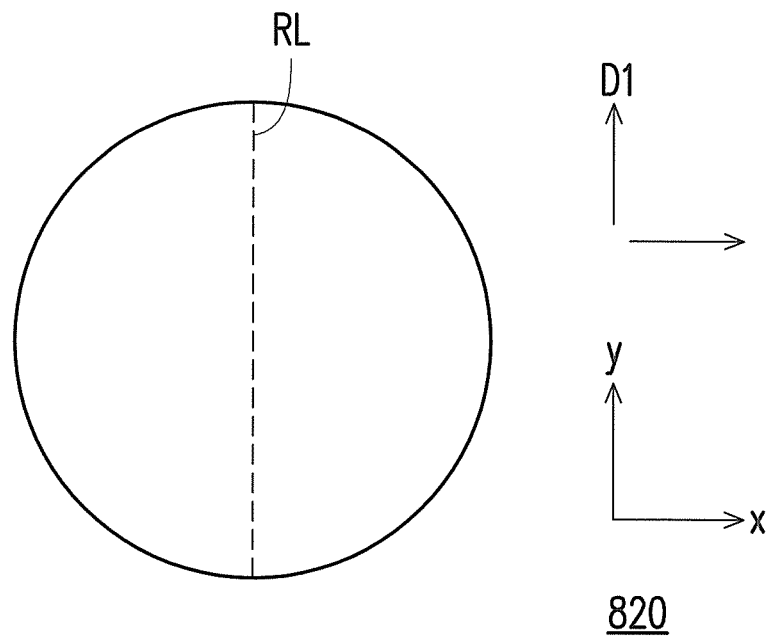
Figure 8B:
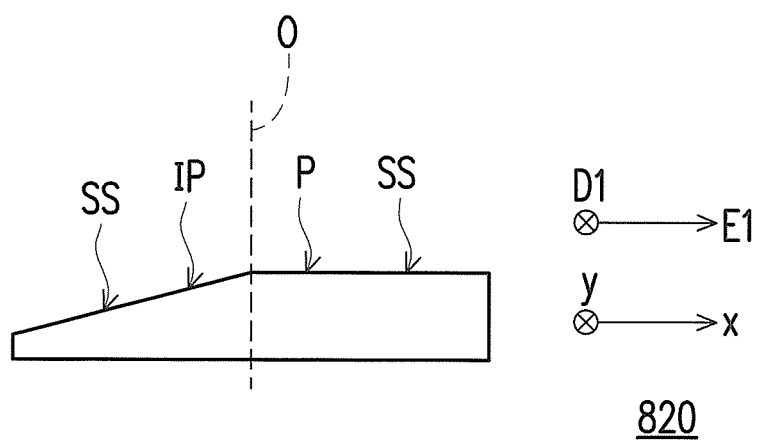
Figure 9A:
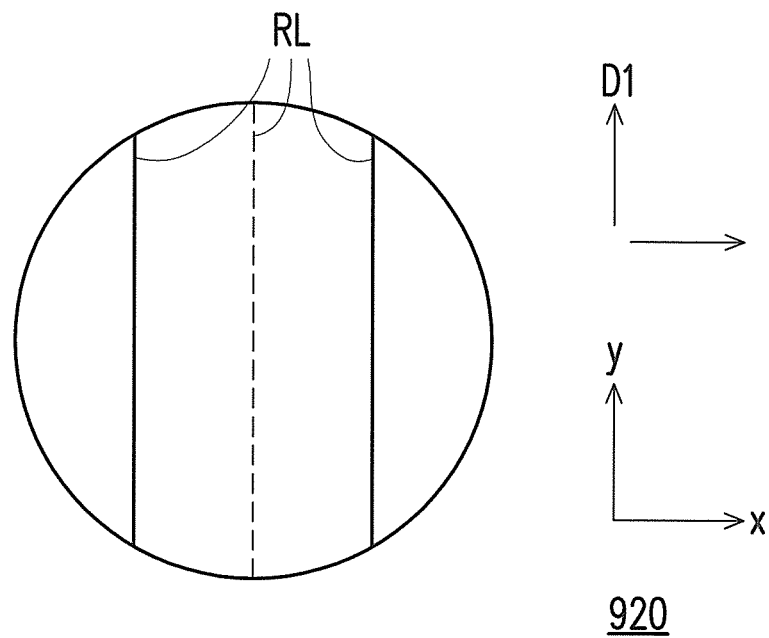
Figure 9B:
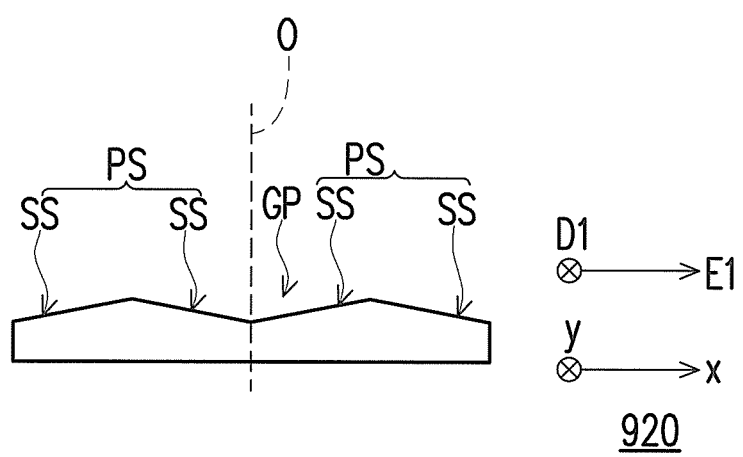
Figure 10A:
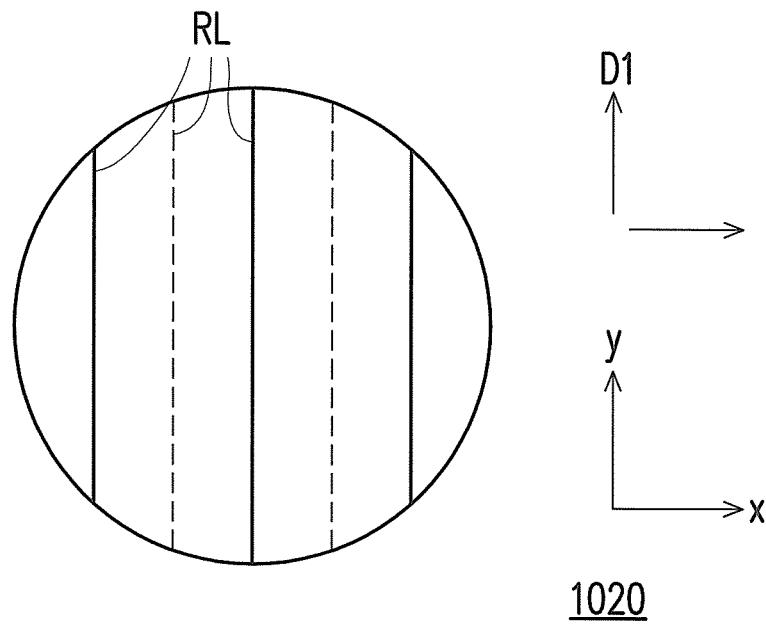
Figure 10B:
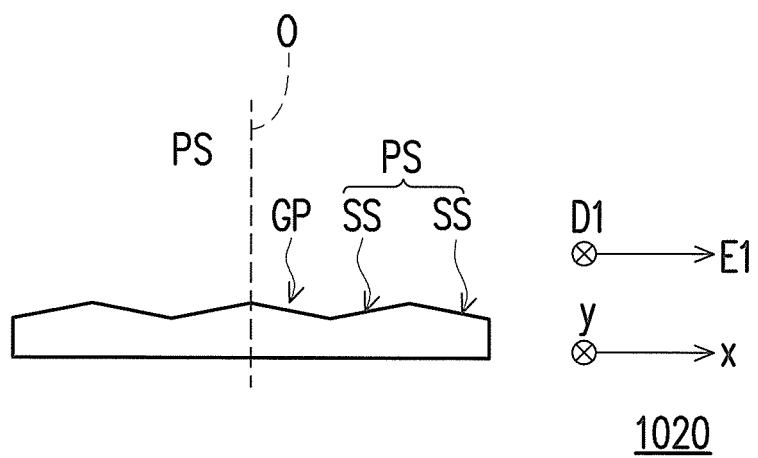

FIG. 6 is a schematic front view illustrating the wavelength conversion element 130 of FIG. 1A. Besides, as shown in FIG. 1A, the wavelength conversion element 130 is located on the transmitting path of the laser beam 60, and the illumination system 100 further includes a light uniforming element 170 located on the transmitting path of the laser beam 60. More specifically, as shown in FIG. 6, the wavelength conversion element 130 in this embodiment includes at least one wavelength conversion areas 131a, 131b and at least one light transmission area 133. For example, in this embodiment, the wavelength conversions areas 131a and 131b respectively include a phosphor area having a phosphor layer (not shown), wherein the phosphor layers included by the wavelength conversion areas 131a and 131b and the laser beam 60 are different in color. For example, colors of the phosphor layers included by the wavelength conversion areas 131a and 131b may respectively be red and green, for example. The at least one wavelength conversion areas 131a and 131b and the at least one light transmission area 133 are capable of moving, so as to sequentially insert into the transmitting path of the laser beam 60.

When the at least one wavelength conversion areas 131a and 131b sequentially insert into the transmitting path of the laser beam 60, the laser beam 60 is respectively converted by the at least one wavelength conversion areas 131a and 131b into at least one red or green converted beam 70, and the at least one converted beam 70 may be reflected by the wavelength conversion element 130. Besides, as shown in FIG. 1A, the light combining element 150 is located on a transmitting path of the at least one converted beam 70, so the at least one converted beam 70 may be transmitted to the light combining element 150.

When the at least one light transmission area 133 inserts into the transmitting path of the laser beam 60, the laser beam 60 passes through the wavelength conversion element 130, and is transmitted to the light combining element 150 through a light transmitting module 160. In addition, the laser beam 60 passes through the light combining element 150 to be transmitted to the light uniforming element 170. In addition, the at least one converted beam 70 and the laser beam 60 have colors different from each other, so that the at least one converted beam 70 that is transmitted to the light combining element 150 may be reflected to the light uniforming element 170. In this way, when the at least one wavelength conversion areas 131a and 131b and the at least one light transmission area 133 insert into the transmitting path of the laser beam, the laser beam 60 emitted to the wavelength conversion element 130 may be sequentially converted into a plurality of different colors and transmitted into the light uniforming element 170.

It should be noted that the light combining element 150 in this embodiment is a dichroic mirror or a dichroic prism that allows a blue beam to pass through and provides a reflecting effect to beams of other colors (e.g. red, green, etc.). However, the invention is not limited thereto. In other embodiments, the light combining element 150 may also be a dichroic mirror or a dichroic prism that provides a reflecting effect to a blue beam but allows beams of other colors (e.g. red, green, etc.) to pass through. People having ordinary skills in the art may make the light combining element 150 achieve a similar light combining effect by using the laser beam 60 and the converted beam 70 with an appropriate design of light path, so no further details in this respect will be reiterated below.

Besides, as shown in FIG. 1A, when the laser beam 60 and the converted beam 70 are transmitted to the light uniforming element 170 through the illumination system 100, the light uniforming element 170 uniforms the laser beam 60 and the converted beam 70 of different colors and transmits them to the light valve 210. The light valve 210 is disposed on the transmitting paths of the laser beam 60 and the converted beam 70, so as to convert the laser beam 60 and the converted beam 70 into an image beam 80. The projection lens 220 is disposed on a transmitting path of the image beam 80 to project the image beam 80 on a screen, thereby forming an image. Since the light valve 210 sequentially converts the laser beam 60 and the converted beam 70 of different colors into the image beam 80 of different colors to transmit the same to the projection lens 220 after the laser beam 60 and the converted beam 70 of different colors are converged at the light valve 210, the image projected with the image beam 80 that is converted by the light valve 210 may be a color image.

In addition, it should be noted that even though the anisotropic light expanding element 120 of this embodiment is exemplified with a wadge-shaped element having the convex surface PS, the invention is not limited thereto. In other embodiments, the anisotropic light expanding element 120 may have a different design of structure. Details in this respect are provided below with reference of FIGS. 7A to 10B.

FIGS. 7A, 8A, 9A, and 10A are schematic front views illustrating changes of different kinds of the anisotropic light expanding element 120 of FIG. 1A. FIGS. 7B, 8B, 9B, and 10B are respectively schematic cross-sectional views illustrating the anisotropic light expanding elements 120 of FIGS. 7A, 8A, 9A, and 10A. Referring to FIGS. 7A to 10B, anisotropic light expanding elements 720, 820, 920, and 1020 are similar to the anisotropic light expanding element 120 shown in FIG. 2A, and the differences therebetween are described below. In an embodiment shown in FIGS. 7A and 7B, two adjacent subsurfaces SS of the anisotropic light expanding element 720 form a concave portion GP, and in an embodiment shown in FIGS. 8A and 8B, two adjacent subsurfaces SS of the anisotropic light expanding element 820 form an inclined platform having a platform P and an inclined plane IP. In embodiments shown in FIGS. 9A and 9B as well as FIGS. 10A and 10B, every two adjacent subsurfaces SS of the anisotropic light expanding elements 920 and 1020 form the convex surface PS, and there is at least one concave portion GP between the convex surfaces PS. In the embodiments, when the laser beam 60 passes through the anisotropic light expanding element 120, the laser beam 60 that passes through inclined parts of the anisotropic light expanding elements 720, 820, 920, 1020 is deflected, whereas the beam that passes through the platform P remains to be in the original direction. In this way, the anisotropic light expanding elements 720, 820, 920, and 1020 also achieve the effect of adjusting a light spot and have similar effects and advantages of the anisotropic light expanding element 120. Therefore, no further details in this respect will be reiterated hereinafter.

Figure 11A:
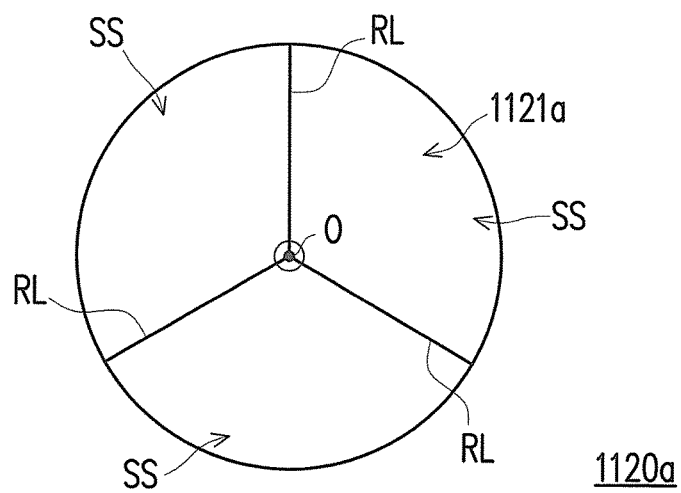
FIGS. 11A to 11C are schematic front views illustrating different embodiments of anisotropic light expanding elements of FIG. 1A.
Figure 11B:
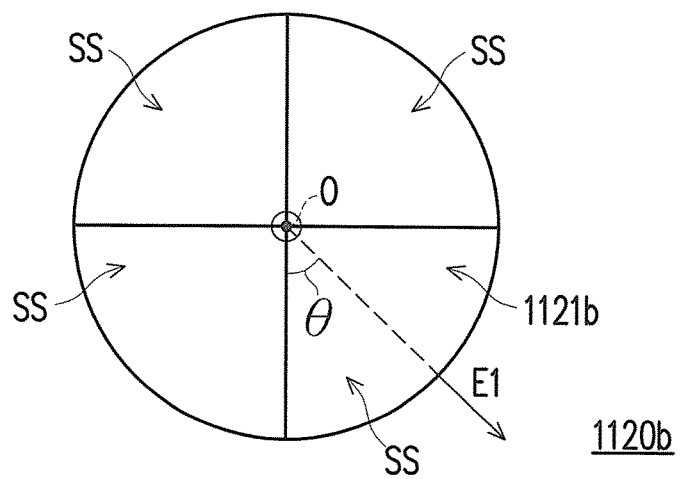
Figure 11C:
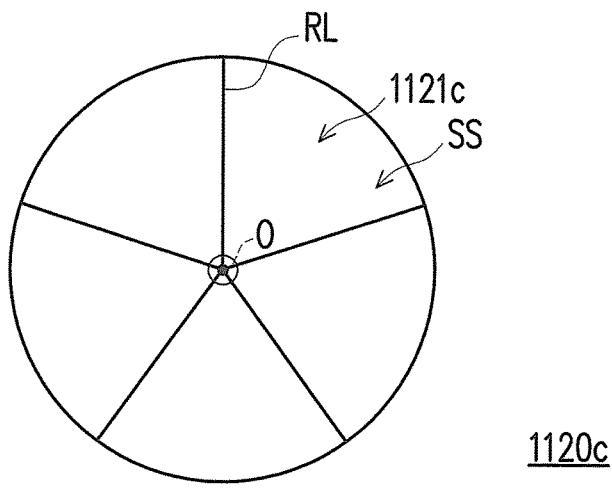

FIGS. 11A to 11C are schematic front views illustrating different embodiments of the anisotropic light expanding element 120 of FIG. 1A. Referring to FIGS. 11A to 11C, anisotropic light expanding elements 1120a, 1120b, and 1120c are similar with the anisotropic light expanding element 120 shown in FIG. 2A, and the differences therebetween are described below. In an embodiment shown in FIGS. 11A to 11C, the subsurfaces SS connected to each other in the anisotropic light expanding elements 1120a, 1120b, and 1120c are arranged to surround the optical axis O, such that the bent surface 121 form a pyramidal surface. For example, as shown in FIGS. 11A to 11C, the bent surface 121 may be a triangular-pyramidal surface (as shown in FIG. 11A), a quadrangular-pyramidal surface (as shown in FIG. 11B), or a pentagonal-pyramidal surface (as shown in FIG. 11C). However, the invention is not limited thereto. In these embodiments, when the laser beam 60 passes through the anisotropic light expanding element 1120a, 1120b, or 1120c, the laser beam 60 that passes through a bent surface 1121a, 1121b, or 1121c of the anisotropic light expanding element 1120a, 1120b, or 1120c is deflected. In this way, the anisotropic light expanding element 1120a, 1120b, or 1120c also achieves the effect of adjusting a light spot.

For example, as shown in FIG. 11A, in this embodiment, the fast axis of the laser beam 60 may be substantially located between the ridges RL of the subsurfaces SS that are connected to each other. In this way, when the laser beam 60 passes through the anisotropic light expanding element 1120a having the triangular-pyramidal surface, the laser beam 60 that passes through an upper left portion of the anisotropic light expanding element 1120a of FIG. 11A is deflected toward the lower right, the laser beam 60 that passes through an upper right portion of the anisotropic light expanding element 1120a is deflected toward the lower left, and the laser beam 60 that passes through a lower middle portion of the anisotropic light expanding element 1120a is deflected upward, for example. In addition, after the laser beam 60 passes through the anisotropic light expanding element 1120a, the laser beam 60 converges and then expands in the light expanding direction E1, thereby achieving the effect of adjusting a light spot.

Besides, in the embodiment of FIG. 11B, the slow axis of the laser beam 60 may substantially be located between the ridges RL of the subsurfaces SS that are connected to each other, and an included angle of the ridges RL of the subsurfaces SS that are connected to each other is 45 degrees. In other words, in the embodiment of FIG. 11B, an included angle θ between the light expanding direction E1 and the ridges RL of the subsurfaces SS that are connected to each other is also 45 degrees. Thus, when the laser beam 60 passes through the anisotropic light expanding element 1120b, the laser beam 60 that passes through the bent surface 1121b of the light expanding element 1120b is also deflected and converges and then expands in the light expanding direction E1, thereby achieving the effect of adjusting a light spot. Similarly, in the embodiment of FIG. 11C, the fast axis of the laser beam 60 may substantially be located between the ridges RL of the subsurfaces SS that are connected to each other. When the laser beam 60 passes through the anisotropic light expanding element 1120c having the pentagonal-pyramidal surface, the laser beam 60 also converges and then expands in the light expanding direction E1. Therefore, the anisotropic light expanding element 1120c also has the effect of adjusting a light spot.

Figure 12:
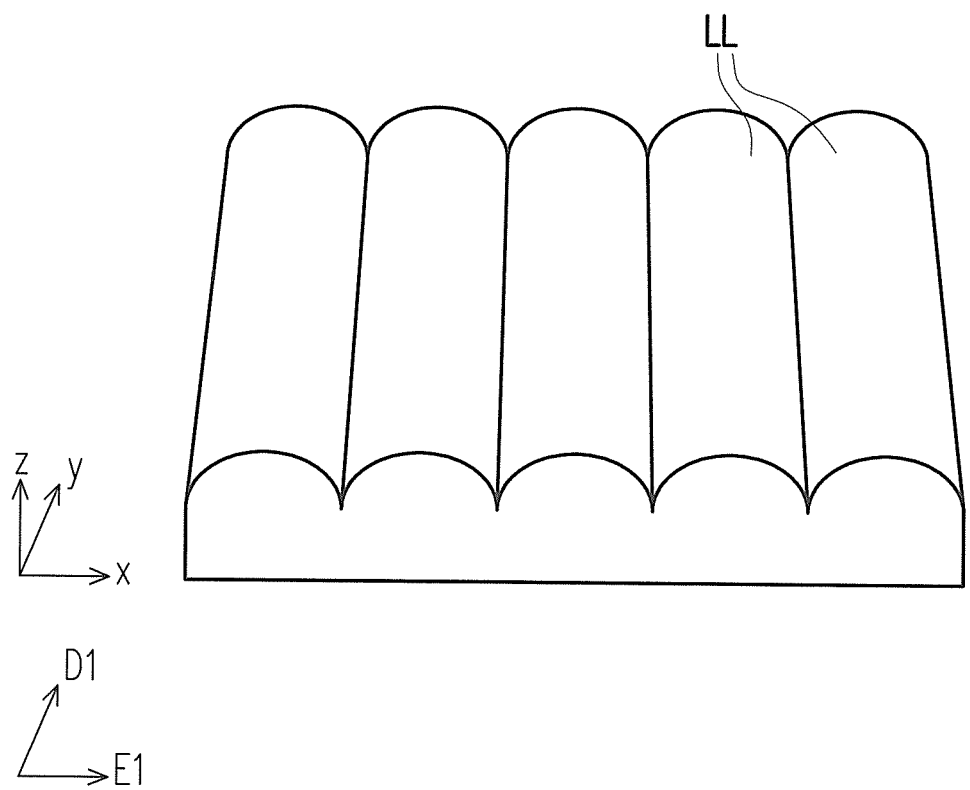
FIG. 12 is a schematic perspective view illustrating another anisotropic light expanding element of FIG. 1A.

FIG. 12 is a schematic perspective view illustrating another anisotropic light expanding element of FIG. 1A. Referring to FIG. 12, an anisotropic light expanding element 1220 is similar with the anisotropic light expanding element 120 shown in FIG. 2A, and the difference therebetween is described below. In this embodiment, the anisotropic light expanding element 1220 includes a plurality of cylindrical lenses LL that are arranged along the light expanding direction E1 and extend along the first direction D1. In addition, the fast axis of the laser beam 60 is substantially parallel to the first direction D1. In this way, when the laser beam 60 passes through the anisotropic light expanding element 1220, the cylindrical lenses LL also deflect the laser beam 60. In addition, since the subsurfaces SS are arranged along the light expanding direction E1 (i.e. x direction) in this embodiment, the anisotropic light expanding element 1220 mainly serves to deflect a component of the laser beam 60 in x direction, but does not deflect a component of the laser beam 60 in y direction. Thus, the anisotropic light expanding element 1220 also achieves the effect of adjusting a light spot and has similar effects and advantages of the anisotropic light expanding element 120. Therefore, no further details in this respect will be reiterated hereinafter.

Besides, in an embodiment not shown herein, the anisotropic light expanding element may also be an anisotropic diffusion film having a plurality of optical micro-structures on the anisotropic diffusion film. The micro-structures are formed by miniaturizing structures of the convex surface PS, the concave portion GP, the pyramidal or conical surface, or the cylindrical lens LL of the anisotropic light expanding element 120, for example. Thus, the anisotropic diffusion film also achieves the effect of adjusting a light spot and has similar effects and advantages of the anisotropic light expanding element 120. Therefore, no further details in this respect will be reiterated hereinafter.

In view of the above, since the anisotropic light expanding elements 720, 820, 920, 1020, 1120*a*, 1120*b*, 1120*c*, and 1220 and the anisotropic diffusion film have the effect of adjusting a light spot, the anisotropic light expanding elements 720, 820, 920, 1020, 1120*a*, 1120*b*, 1120*c*, and 1220 and the anisotropic diffusion film may be applied in the projection apparatus 200 shown in FIG. 1A for the projection apparatus 200 to achieve similar effects or advantages. Therefore, no further details in this respect will be reiterated hereinafter.

Figure 13:
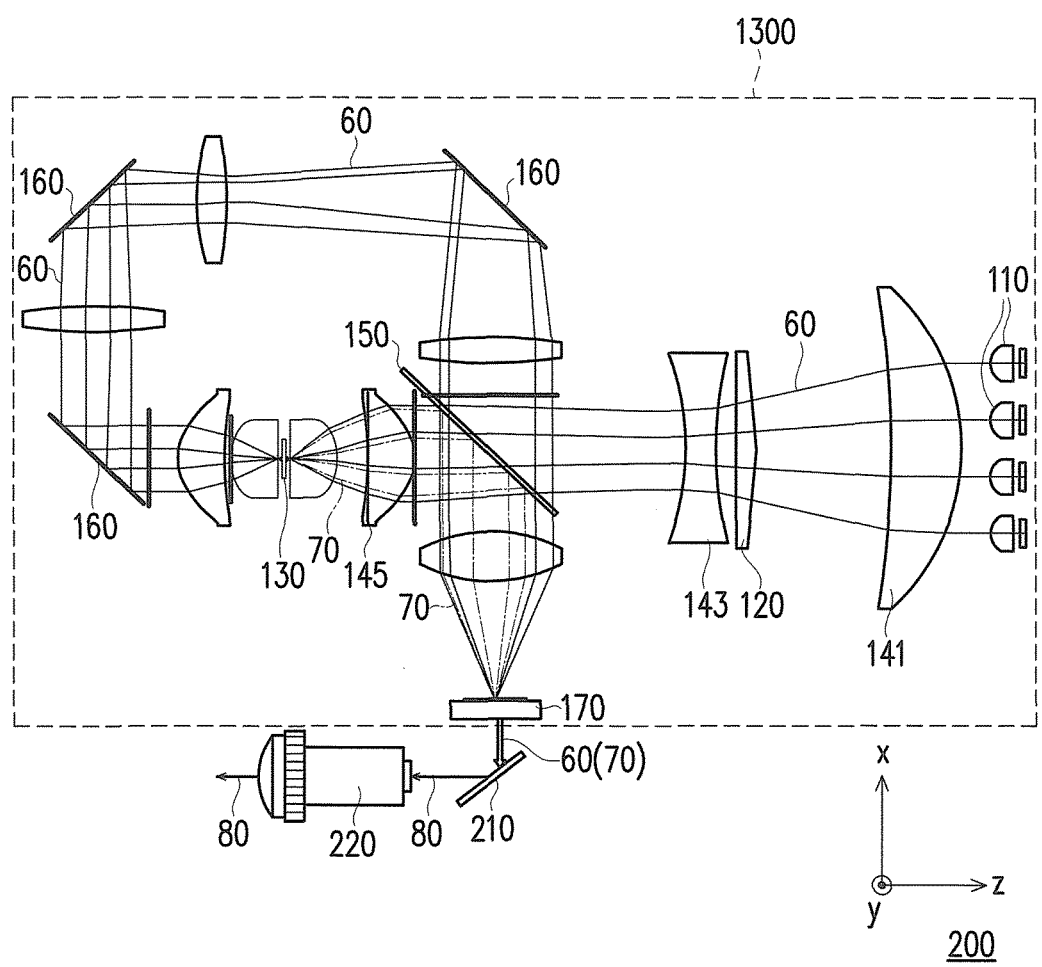
FIG. 13 is a schematic view illustrating a framework of a projection apparatus according to another embodiment of the invention.

FIG. 13 is a schematic view illustrating a framework of a projection apparatus according to another embodiment of the invention. Referring to FIG. 13, an illumination system 1300 is similar to the illumination system 100 shown in FIG. 1A, and the difference therebetween is described below. In this embodiment, the anisotropic light expanding element 120 is located between the lens 141 and the lens 143. Since the anisotropic light expanding element 120 is still capable of transmitting the laser beam 60 to the wavelength conversion element 130 through the anisotropic light expanding element 120 to achieve the effect of adjusting a light spot, the projection apparatus 1300 still has similar effects and advantages of the projection apparatus 200. Therefore, no further details in this respect will be reiterated hereinafter.

Moreover, although the anisotropic light expanding element 120 described in the previous embodiments is exemplified by being located between the at least one laser source 110 and the wavelength conversion element 130, the disclosure is not limited thereto. In other embodiments, the anisotropic light expanding element 120 may also be located in a different position of the projection apparatus 200. Details in this respect are described below with reference of FIGS. 14 and 15.

Figure 14:
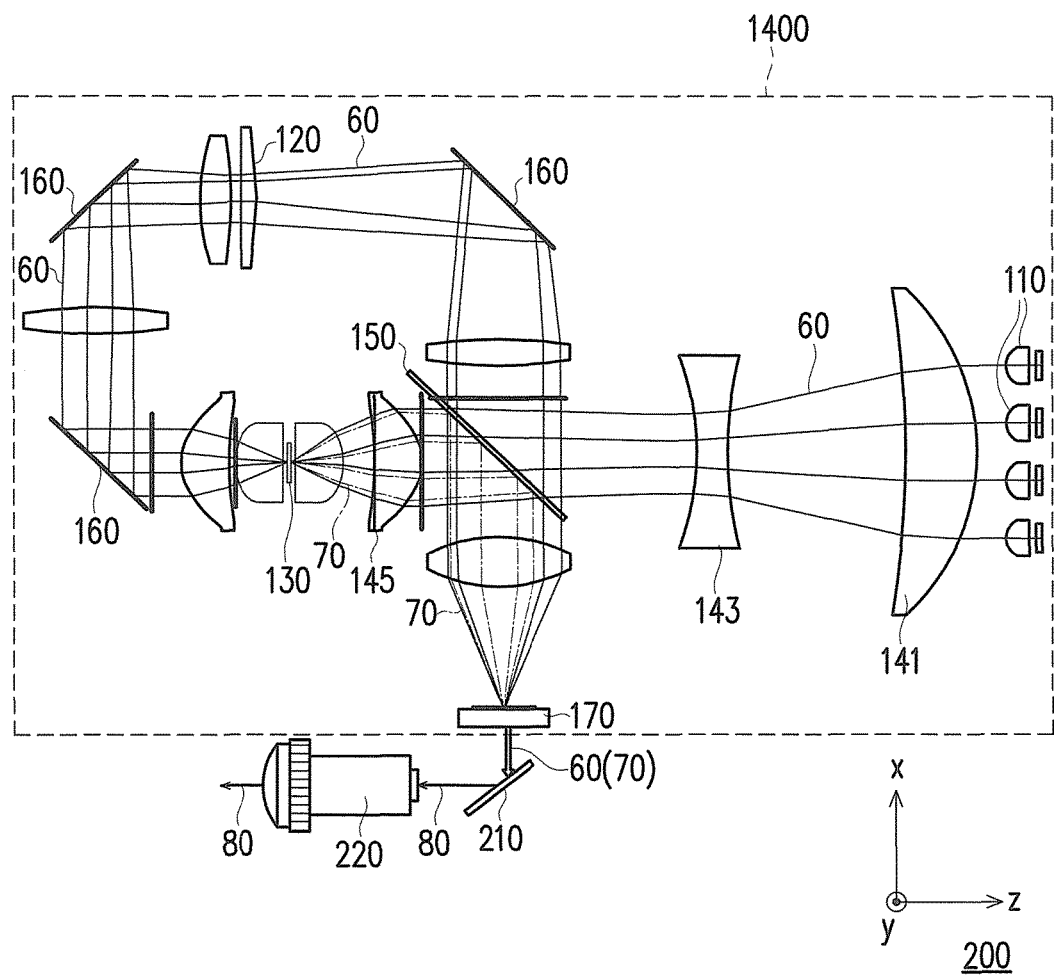
FIG. 14 is a schematic view illustrating a framework of a projection apparatus according to still another embodiment of the invention.

FIG. 14 is a schematic view illustrating a framework of a projection apparatus according to still another embodiment of the invention. Referring to FIG. 14, an illumination system 1400 is similar to the illumination system 100 shown in FIG. 1A, and the difference therebetween is described below. Referring to FIGS. 6 and 14, in this embodiment, the wavelength conversion element 130 is located on the transmitting path of the laser beam 60 between the at least one laser source 110 and the anisotropic light expanding element 120. When the at least one light transmission area 133 inserts into the transmitting path of the laser beam 60, the laser beam 60 passes through the wavelength conversion element 130 and is transmitted to the anisotropic light expanding element 120. In addition, the laser beam 60 is transmitted to the light combining element 150 through the anisotropic light expanding element 150. More specifically, the laser beam 60 that passes through the wavelength conversion element 130 is also anisotropic (i.e. elliptical cone-shaped). However, since the converted beam converted by the wavelength conversion element is conical, the difference in shapes of light cones between the laser beam and the converted beam may reduce a color uniformity of the beam provided by the illumination system and influences a color uniformity of projection. But in this embodiment, since a light shape of the laser beam 60 that passes the wavelength conversion element 130 may be adjusted and converge in advance after passing through the anisotropic light expanding element 120, the color uniformity of the beam provided by the illumination system may not be reduced when the laser beam 60 is transmitted to the color uniforming element 170. In this way, the color uniformity of projection is improved.

Besides, it should be noted that in the embodiment shown in FIG. 1A, since the anisotropic light expanding element 120 of the illumination system 100 is located between the laser source 110 and the wavelength conversion element 130, the shape of the light cone of the laser beam 60 may be adjusted before the laser beam 60 is transmitted to the wavelength conversion element 130, so as to be similar to a cone shape. Therefore, the effect of improving the color uniformity of illumination and projection is also achieved.

Figure 15:
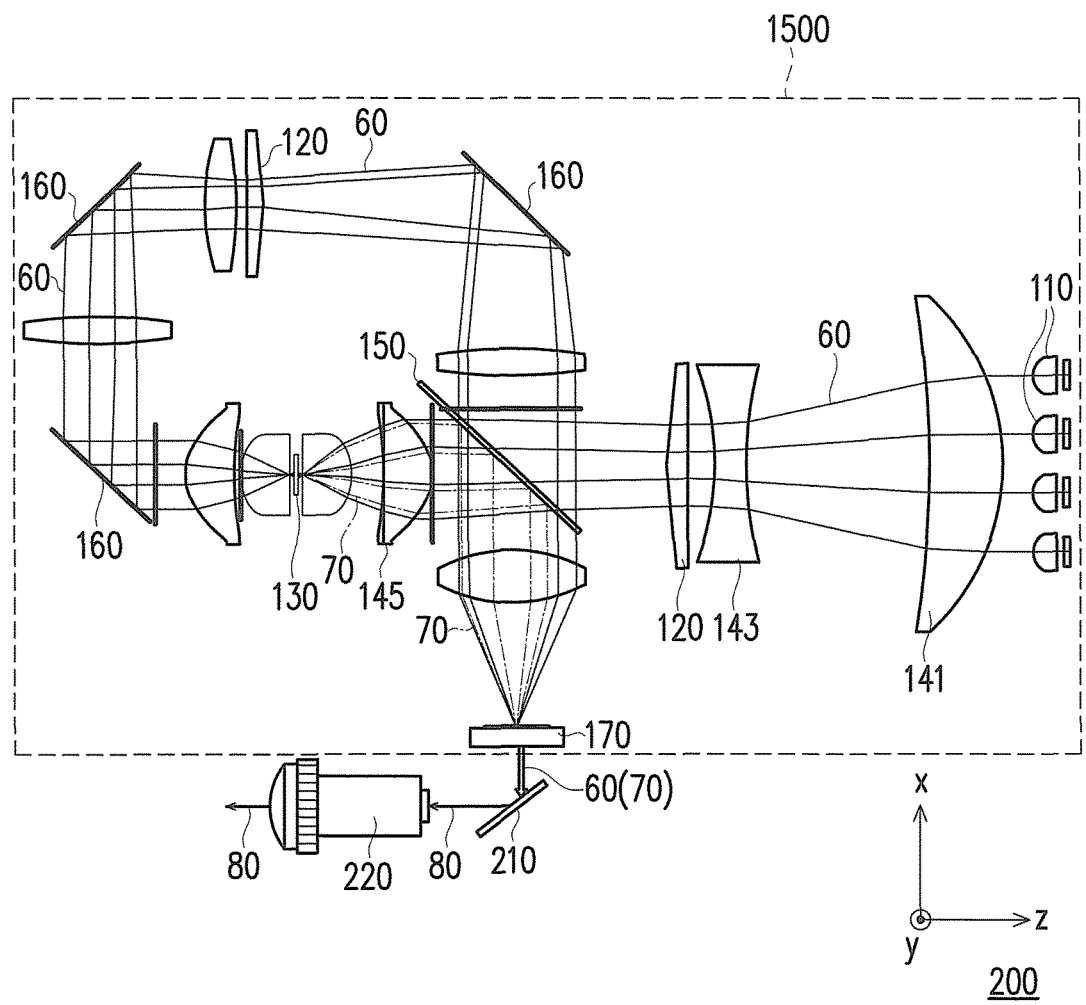
FIG. 15 is a schematic view illustrating a framework of a projection apparatus according to yet another embodiment of the invention.

FIG. 15 is a schematic view illustrating a framework of a projection apparatus according to yet another embodiment of the invention. Referring to FIG. 15, an illumination system 1500 is similar to the illumination system 100 shown in FIG. 1A, and the difference therebetween is described below. Referring to FIG. 15, in this embodiment, the at least one anisotropic light expanding element 120 are two anisotropic light expanding elements 120. One of the two anisotropic light expanding elements 120 is located between the at least one laser source 110 and the wavelength conversion element 130, and the wavelength conversion element 130 is located on the transmitting path of the laser beam 60 between the at least one laser source 110 and the other of the two anisotropic light expanding elements 120. In other words, in this embodiment, the one of the anisotropic light expanding elements 120 located between the at least one laser source 110 and the wavelength conversion element 130 allows the laser beam 60 to be transmitted to the wavelength conversion element 130 through the anisotropic light expanding element 120, thereby achieving the effect of adjusting a light spot. In addition, since the wavelength conversion element 130 is located on the transmitting path of the laser beam 60 between the at least one laser source 110 and the other of the anisotropic light expanding element 120, the color uniformity of projection may be improved. Therefore, the illumination system 1500 is capable of achieving similar effects and advantages of the illumination systems 1400 and 100, allowing the projection apparatus 200 to achieve similar effects and advantages. Therefore, no further details in this respect will be reiterated hereinafter.

Besides, since the anisotropic light expanding elements 720, 820, 920, 1020, 1120*a*, 1120*b*, 1120, and 1220 and the anisotropic diffusion film also have the effect of adjusting a light spot, the anisotropic light expanding elements 720, 820, 920, 1020, 1120*a*, 1120*b*, 1120, and 1220 and the anisotropic diffusion film may be applied in the illumination systems 1300, 1400, and 1500, such that the projection apparatus 200 still achieves similar effects or advantages. Therefore, no further details in this respect will be reiterated hereinafter.

In view of the above, the subsurfaces of the anisotropic light expanding element in the illumination system and projection apparatus according to the embodiments of the invention have different inclination angles with respect to the optical axis. Therefore, the laser beam that passes through the subsurfaces of the anisotropic light expanding element may have different deflected directions. In this way, light expanding of the laser beam along the direction of the slow axis is achieved. Therefore, a laser light spot may be adjusted anisotropically, and energy concentration is reduced. Moreover, the optical coupling loss that may be potentially rendered when the laser beam is coupled to the wavelength conversion element is prevented, and the issue of heat accumulation of a fluorescent wheel is reduced as well. In addition, in the illumination system and projection apparatus according to the embodiments of the invention, the wavelength conversion element may also be disposed between on the transmitting path of the laser beam between the at least one laser source and the other of the anisotropic light expanding element, so as to improve the color uniformity of projection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
at least one laser source emitting a laser beam;
at least one anisotropic light expanding element located on a transmitting path of the laser beam, allowing the laser beam to expand in a light expanding direction substantially parallel to a slow axis of the laser beam; and
a wavelength conversion element located on the transmitting path of the laser beam,
wherein the wavelength conversion element comprises at least one wavelength conversion area and at least one light transmission area, the at least one wavelength conversion area and the at least one light transmission area are capable of moving, such that the at least one wavelength conversion area and the at least one light transmission area insert into the transmitting path of the laser beam by turns, the laser beam passing through the wavelength conversion element when the at least one light transmission area inserts into the transmitting path of the laser beam, and the laser beam being converted into at least one converted beam by the at least one wavelength conversion area when the at least one wavelength conversion area inserts into the transmitting path of the laser beam.

2. The illumination system as claimed in claim 1, wherein after the laser beam passes through the at least one anisotropic light expanding element, the laser beam expands a light spot in the light expanding direction after the light spot converges.

3. The illumination system as claimed in claim 1, wherein the anisotropic light expanding element has an optical axis and a bent surface comprising a plurality of subsurfaces connected to each other, wherein at least some of the subsurfaces are arranged along the light expanding direction, and the subsurfaces have different inclination angles with respect to the optical axis.

4. The illumination system as claimed in claim 3, wherein a boundary of at least two adjacent subsurfaces is a ridge, and a fast axis of the laser beam is substantially parallel to the ridge.

5. The illumination system as claimed in claim 4, wherein the anisotropic light expanding element is a wadge-shaped element, the subsurfaces connected to each other extend along a first direction, and the fast axis of the laser beam is substantially parallel to the first direction.

6. The illumination system as claimed in claim 4, wherein two adjacent subsurfaces form a concave portion.

7. The illumination system as claimed in claim 4, wherein two adjacent subsurfaces form a convex surface.

8. The illumination system as claimed in claim 4, wherein every two adjacent subsurfaces form a convex surface, and there is at least one concave portion between the convex surfaces.

9. The illumination system as claimed in claim 3, wherein the subsurfaces connected to each other are arranged to surround the optical axis, such that the bent surface forms a pyramidal surface.

10. The illumination system as claimed in claim 1, further comprising:
a light combining element located between the at least one laser source and the wavelength conversion element, and located on a transmitting path of the at least one converted beam and the transmitting path of the laser beam passing through the wavelength conversion element.

11. The illumination system as claimed in claim 10, wherein the wavelength conversion element is located on the transmitting path of the laser beam between the at least one laser source and the anisotropic light expanding element, and, the laser beam passes through the wavelength conversion element to be transmitted to the anisotropic light expanding element and is transmitted to the light combining element through the anisotropic light expanding element when the at least one light transmission area inserts into the transmitting path of the laser beam.

12. The illumination system as claimed in claim 1, wherein the anisotropic light expanding element is located between the at least one laser source and the wavelength conversion element, and the laser beam is transmitted to the wavelength conversion element through the anisotropic light expanding element.

13. The illumination system as claimed in claim 1, wherein the at least one anisotropic light expanding element comprises two anisotropic light expanding elements, one of the two anisotropic light expanding elements is located between the at least one laser source and the wavelength conversion element, and the wavelength conversion element is located on the transmitting path of the laser beam between the at least one laser source and the other of the two anisotropic light expanding elements.

14. The illumination system as claimed in claim 1, wherein the anisotropic light expanding element comprises a plurality of cylindrical lenses, wherein the cylindrical lenses are arranged along the light expanding direction and extend along a first direction, and a fast axis of the laser beam is substantially parallel to the first direction.

15. The illumination system as claimed in claim 1, wherein the anisotropic light expanding element is an anisotropic diffusion film.

16. A projection apparatus, comprising:
an illumination system comprising:
at least one laser source emitting a laser beam;
at least one anisotropic light expanding element located on a transmitting path of the laser beam, allowing the laser beam to expand in a light expanding direction substantially parallel to a slow axis of the laser beam; and
a wavelength conversion element located on the transmitting path of the laser beam and comprising at least one wavelength conversion area and at least one light transmission area, the at least one wavelength conversion area and the at least one light transmission area are capable of moving, such that the at least one wavelength conversion area and the at least one light transmission area insert into the transmitting path of the laser beam by turns, the laser beam passing through the wavelength conversion element when the at least one light transmission area inserts into the transmitting path of the laser beam, and the laser beam being converted into at least one converted beam by the at least one wavelength conversion area when the at least one wavelength conversion area inserts into the transmitting path of the laser beam;
a light valve disposed on the transmitting path of the laser beam and a transmitting path of the converted beam for converting the laser beam and the converted beam into an image beam; and
a projection lens disposed on a transmitting path of the image beam.

17. The projection apparatus as claimed in claim 16, wherein after the laser beam passes through the at least one anisotropic light expanding element, the laser beam expands a light spot in the light expanding direction after the light spot converges.

18. The projection apparatus as claimed in claim 16, wherein the anisotropic light expanding element has an optical axis and a bent surface comprising a plurality of subsurfaces connected to each other, wherein at least some of the subsurfaces are arranged along the light expanding direction, and the subsurfaces have different inclination angles with respect to the optical axis.

19. The projection apparatus as claimed in claim 18, wherein a boundary of at least two adjacent subsurfaces is a ridge, and a fast axis of the laser beam is substantially parallel to the ridge.

20. The projection apparatus as claimed in claim 19, wherein the anisotropic light expanding element is a wadge-shaped element, the subsurfaces connected to each other extend along a first direction, and the fast axis of the laser beam is substantially parallel to the first direction.

21. The projection apparatus as claimed in claim 19, wherein two adjacent the subsurfaces form a concave portion.

22. The projection apparatus as claimed in claim 19, wherein two adjacent the subsurfaces form a convex surface.

23. The projection apparatus as claimed in claim 19, wherein every two adjacent subsurfaces form a convex surface, and there is at least one concave portion between the convex surfaces.

24. The projection apparatus as claimed in claim 18, wherein the subsurfaces connected to each other are arranged to surround the optical axis, such that the bent surface forms a pyramidal surface.

25. The projection apparatus as claimed in claim 16, further comprising:
a light combining element located between the at least one laser source and the wavelength conversion element, and located on the transmitting path of the at least one converted beam and the transmitting path of the laser beam passing through the wavelength conversion element.

26. The projection apparatus as claimed in claim 25, wherein the wavelength conversion element is located on the transmitting path of the laser beam between the at least one laser source and the anisotropic light expanding element, and the laser beam passes through the wavelength conversion element to be transmitted to the anisotropic light expanding element and is transmitted to the light combining element through the anisotropic light expanding element when the at least one light transmission area inserts into the transmitting path of the laser beam.

27. The projection apparatus as claimed in claim 16, wherein the anisotropic light expanding element is located between the at least one laser source and the wavelength conversion element, and the laser beam is transmitted to the wavelength conversion element through the anisotropic light expanding element.

28. An illumination system, comprising:
at least one laser source emitting a laser beam;
at least one anisotropic light expanding element located on a transmitting path of the laser beam, allowing the laser beam to expand in a light expanding direction substantially parallel to a slow axis of the laser beam; and
a wavelength conversion element located on the transmitting path of the laser beam,
wherein the anisotropic light expanding element is located between the at least one laser source and the wavelength conversion element, and the laser beam is transmitted to the wavelength conversion element through the anisotropic light expanding element.

* * * * *